US008400471B2

(12) United States Patent
Leung

(10) Patent No.: US 8,400,471 B2
(45) Date of Patent: Mar. 19, 2013

(54) INTERPRETATION OF CONSTRAINED OBJECTS IN AUGMENTED REALITY

(75) Inventor: Henry Leung, Calgary (CA)

(73) Assignee: Empire Technology Development, LLC, Wilmington, DE (US)

(*) Notice: Subject to any disclaimer, the term of this patent is extended or adjusted under 35 U.S.C. 154(b) by 609 days.

(21) Appl. No.: 12/719,086

(22) Filed: Mar. 8, 2010

(65) Prior Publication Data

US 2011/0216088 A1 Sep. 8, 2011

(51) Int. Cl.
*G09G 5/00* (2006.01)
(52) U.S. Cl. .................................................. 345/633
(58) Field of Classification Search .................. None
See application file for complete search history.

(56) References Cited

U.S. PATENT DOCUMENTS

| 5,473,737 A * | 12/1995 | Harper ........................ 345/592 |
| 6,760,488 B1 | 7/2004 | Moura et al. |
| 7,663,649 B2 * | 2/2010 | Takemoto et al. ............ 345/633 |
| 2002/0191862 A1 | 12/2002 | Neumann et al. |
| 2003/0132878 A1 | 7/2003 | Devereux et al. |
| 2004/0249504 A1 | 12/2004 | Gutmann et al. |
| 2006/0033733 A1 * | 2/2006 | Urisaka et al. .............. 345/419 |
| 2007/0242899 A1 | 10/2007 | Satoh et al. |

OTHER PUBLICATIONS

"Incongruent Events"; DIRAC; Issue No. 9, pp. 1-4 (Jun. 2008).
Doulamis et al., "Semantic Object Extraction in Stereo Video Sequences"; CiteSeerX.
International Search Report for patent application with application No. PCT/US11/25028, dated Nov. 19, 2012, 12 pages.

* cited by examiner

*Primary Examiner* — Ryan R Yang
(74) *Attorney, Agent, or Firm* — Steven S. Rubin, Esq.; Moritt Hock & Hamroff LLP

(57) ABSTRACT

Technologies are generally described for interpretation of constrained objects in augmented reality. An example system may comprise a processor, a memory arranged in communication with the processor, and a display arranged in communication with the processor. An example system may further comprise a sensor arranged in communication with the processor. The sensor may be effective to detect measurement data regarding a constrained object. The sensor may be configured to send the measurement data to the processor. The processor may be effective to receive the measurement data, determine a model for the object, and process the measurement data to produce weighted measurement data. The processor may also be effective to apply a filter to the model and to the weighted measurement data to produce position information regarding the object, which may be utilized to generate an image based on the position information. The display may be effective to display the image.

31 Claims, 5 Drawing Sheets

INTERPRETATION OF CONSTRAINED OBJECTS IN AUGMENTED REALITY

BACKGROUND

Unless otherwise indicated herein, the materials described in this section are not prior art to the claims in this application and are not admitted to be prior art by inclusion in this section.

In an augmented reality system, a user's view of the real world is enhanced or augmented with additional information generated by a computing device. Through a display provided to the user, the user may see virtual geometric objects placed onto real objects in a scene of interest. Alternatively, non-geometric virtual information may be added about real objects and displayed on the display.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
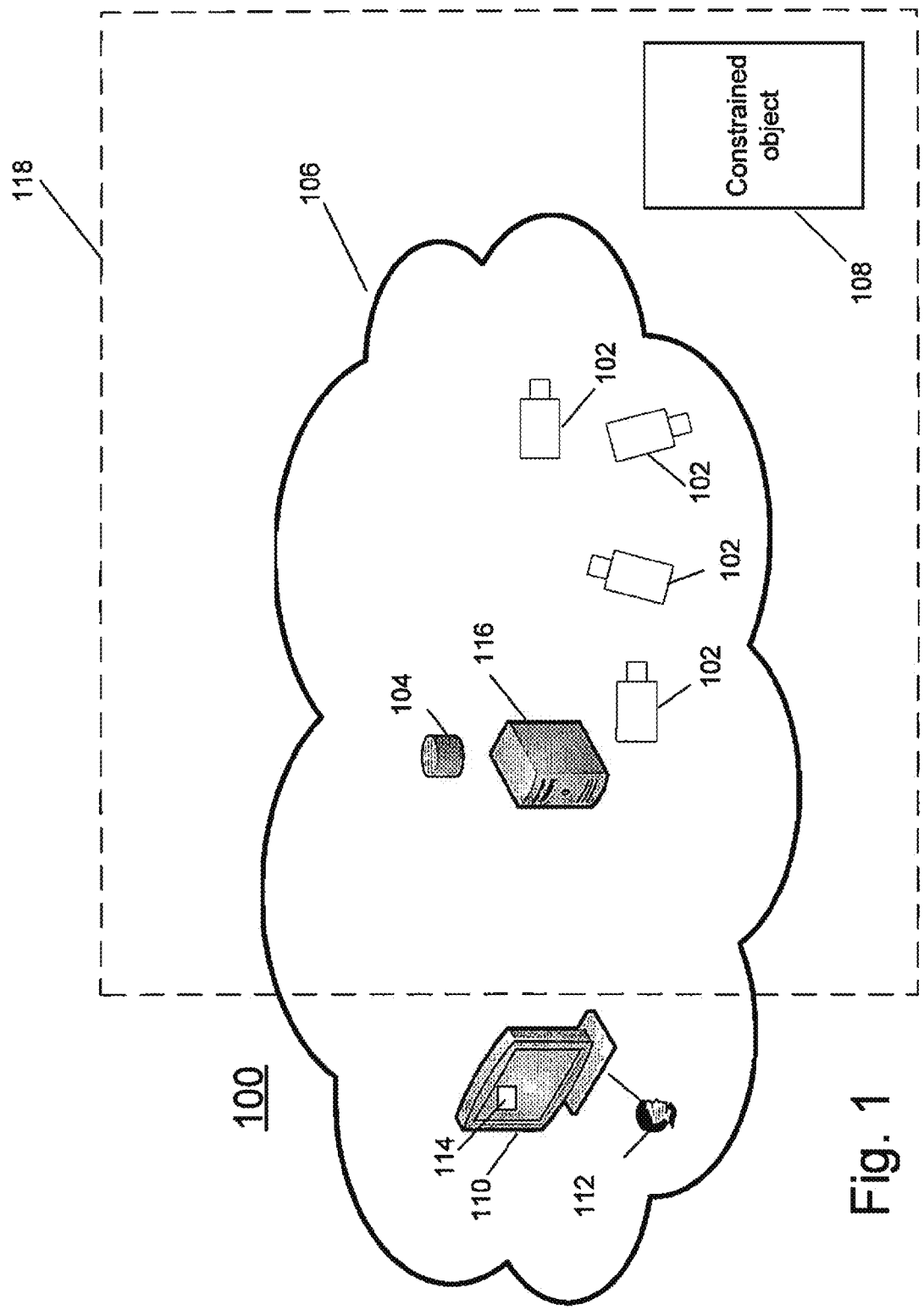
FIG. 1 illustrates some example systems that can be utilized to implement interpretation of constrained objects in augmented reality.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to interpretation of constrained objects in augmented reality.

Briefly stated, technologies are generally described for interpretation of constrained objects in augmented reality. An example system may comprise a processor, a memory arranged in communication with the processor, and a display arranged in communication with the processor. An example system may further comprise a sensor arranged in communication with the processor. The sensor may be effective to detect measurement data regarding a constrained object. The sensor may be configured to send measurement data to the processor. The processor may be effective to receive the measurement data, determine a model for the object, and process the measurement data to produce weighted measurement data. The processor may also be effective to apply a filter to the model and to the weighted measurement data to produce position information regarding the object, which may be utilized to generate an image based on the position information. The display may be effective to display the image.

FIG. 1 illustrates some example systems that can be utilized to implement interpretation of constrained objects in augmented reality, arranged in accordance with at least some embodiments presented herein. System 100 may include one or more sensors 102, a memory 104, and a display 110, all which may be arranged in communication with a processor 116. In some examples, processor 116 may be in arranged communication with sensors 102 and memory 104 through a network 106. As discussed in more detail below, sensors 102 may be adapted to detect measurement data regarding a constrained object 108 in a scene of interest 118. Sensors 102 may be adapted to send measurement data to processor 116. Processor 116 may be adapted to retrieve a model of constrained object 108 from memory 104. Processor 116 may be further effective to retrieve a fusion algorithm from memory 104. Using the fusion algorithm, processor 116 may be adapted to fuse data from the model to the measurement data to produce enhanced position information about object 108. Processor 116 may be configured to combine enhanced position information about object 108 with other information from sensors 102 to produce an image 114 of object 108 in scene of interest 118 on a display 110 that is observable by a user 112. The components of system 100 could be disposed anywhere inside or outside scene of interest 118.

Figure 2:
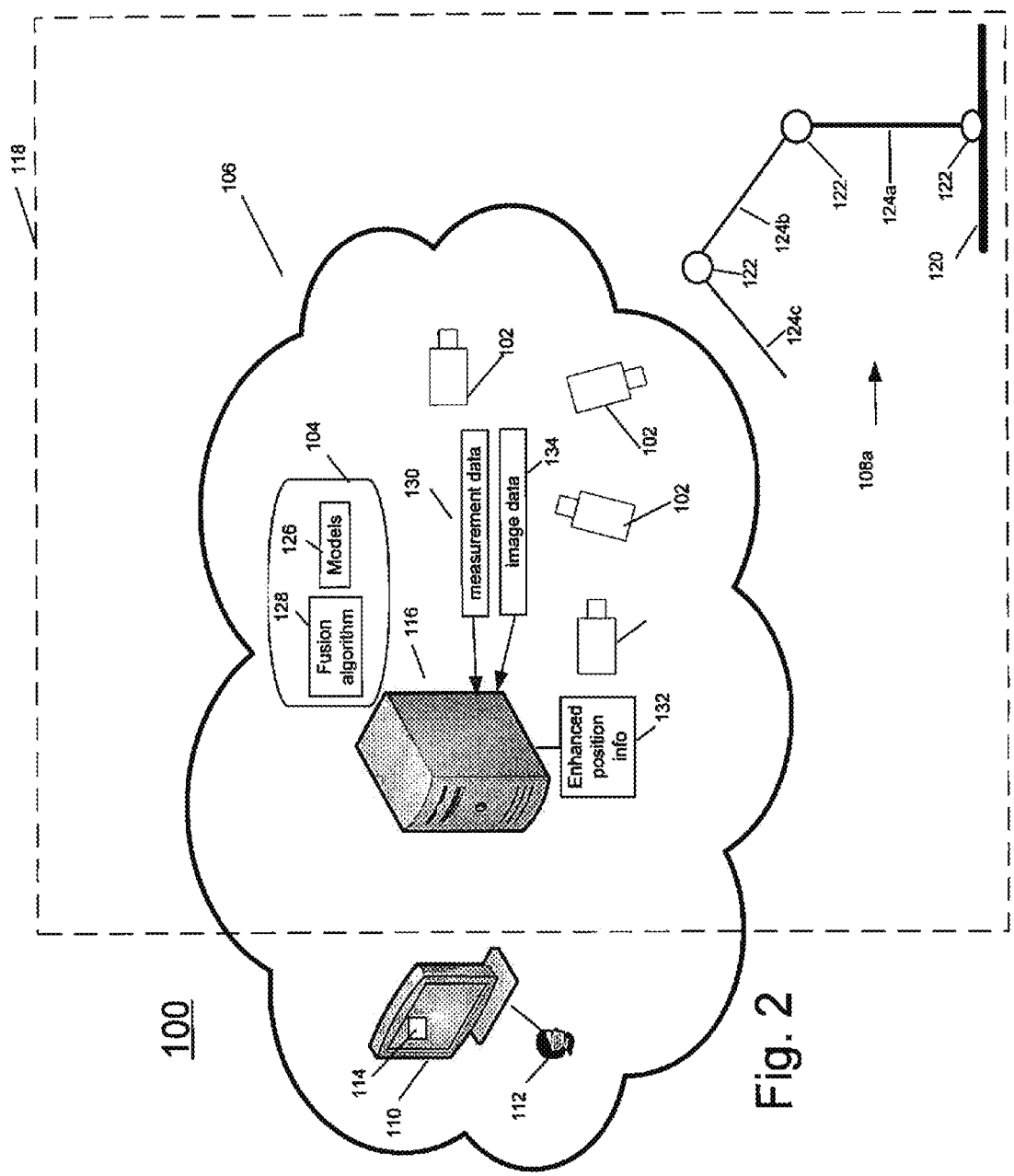
FIG. 2 illustrates some example systems that can be utilized to implement interpretation of constrained objects in augmented reality.

FIG. 2 is an illustration of some example systems that can be utilized to implement interpretation of constrained objects in augmented reality in accordance with at least some embodiments described herein. The system of FIG. 2 is substantially similar to system 100 of FIG. 1, with additional details. Those components in FIG. 2 that are labeled identically to components of FIG. 1 will not be described again for the purposes of clarity.

As illustrated in FIG. 2, an example of constrained object 108 could be an object including a set of rigid components connected at joints that allow for some degrees of freedom such as a robotic arm 108a. Other examples of a constrained object could include a human face with different expressions or lip movements, a walking person, moving vehicles, etc. In some examples, robotic arm 108a may include a base 120, and a plurality of rigid components 124a-124c connected at joints 122. Joints 122 allow for some degrees of freedom for rigid components 124. Joints 122 may allow for translation and/or rotation between components 124.

As discussed above, memory 104 may include stored therein models 126 of constrained objects and/or a fusion algorithm 128. Processor 116 may be adapted to receive image data 134 from a plurality of sensors 102 regarding object 108. Processor 116 may be adapted to use image data 134 to determine which model 126 relates to object 108. In some examples, processor 116 may use object recognition algorithms on image data 134 received from sensors 102 to determine an appropriate model 126. In other examples, user 112 may input which model 126 is to be used by processor 108.

Sensors 102 may be adapted to detect measurement data 130 regarding positions of components 124 of object 108. Processor 116 may be adapted to fuse measurement data 130 with model 126 of object 108 stored in memory 104 using fusion algorithm 128. The fusion results in more information about object 108 that can be displayed to user 112 on display 110 in image 114. For example, a pose of object 108, such as the position and orientation of object 108, can be determined and displayed.

Models 126 can describe physical constraints of locations of components 124 in object 108. For example, constraints may describe co-linearity, or co-planarity of components 124, angle relationships among components, limitations on velocity, acceleration, length, etc. In the robotic arm 108a example referenced above, model 126 may indicate that component 124a is one meter long and that component 124b cannot move faster than 10 meters per second. Inequality constraints may also be used by models 126. For example, constraints may describe a limit on a distance between components or indicate that an angle is greater or less than a defined value. If constraints are in the form of an inequality, processor 116 may be adapted to convert such constraints to an equality using fusion algorithm 128 and extra parameters from image data 134, measurement data 130 and model 126. For example, if a constraint indicates that a velocity is less than 10 meters per second, processor 116 may be adapted to combine parameters in model 126 regarding position and acceleration to convert the inequality to an equality.

For example, a Kalman filter may be used for pose estimation incorporating both state space equality constraints (e.g., a fixed speed for a robot arm) and state space inequality constraints (e.g., maximum attainable speed of a motor). If the constraints are in the form of an inequality, processor 116 may be adapted to convert the inequality constraint to an equality constraint by adding extra parameters to a state vector defining the constraint. This may be implemented by, for example, using an active set method. In such a method, processor 116 may be adapted to treat a subset of the inequality constraints (called the active set) as additional equality constraints. In this way, additional parameters may be added as equality constraints. Processor 116 may be adapted to ignore any inactive constraints when performing the fusion. After a single fusion iteration, processor 116 may be adapted to determine if the solution falls in the space defined by the inequality constraints. If the solution does not fall in that space, processor 116 may be adapted to start from the solution in a previous iteration and move in the direction of a new solution until processor 116 determines a set of constraints that fall in the space defined by the constraints.

In some examples, fusion algorithm 128 is adapted to treat constraints in models 126 like ideal measurements with zero uncertainty. In some examples, fusion algorithm 128 combines the constraints with measurement data 130 from sensors 102. Measurement data 130 may be weighted to take account for noise and then combined with data in models 126 so that model 126 may be mapped to movement of object 108. For example, a Kalman filter, extended Kalman filter or a particle filter could be used in fusion algorithm 128 to combine weighted measurements with constraints in model 126 to produce enhanced position information 132. In some examples, for each piece of measurement data, processor 116 may be adapted to look for whether a corresponding constraint exists in model 126. Similarly, in some examples, for each constraint, processor 116 may be adapted to look for whether a corresponding measurement data 130 exists.

Processor 116 may be adapted to propagate enhanced position information 132 to other pieces of model 126. For example, if enhanced position information 132 provides details about a position of component 124a, model 126 may be used to determine more information about the position of component 124b. Similarly, now provided with more information regarding a position of component 124b, processor 116 can be adapted use model 126 to determine more information about a position of component 124c.

Processor 116 may be adapted to combine enhanced position information 132 with image data 134 to produce image 114 of object 108 on display 110. Image 114 may be based on enhanced position information 132, model 126 and image data 134.

Among other possible benefits, in some examples, pose determination and interpretation problems may be solved by fusing constraints and measurements. By fusing constraints into a pose estimate, information obtained on a pose for one component may be propagated to other components through mutual constraints. In this way, a solution may take into account available measurements and defined constraints.

Among other further benefits, constraints may be added at any time and thus a system in accordance with the disclosure can be implemented in interactive systems. In some examples, constraints and measurements are fused one at a time. In this way, pose estimation may be improved and search complexity of an interpretation tree may be reduced. Any types of constraints may be used including inequality constraints.

Figure 3:
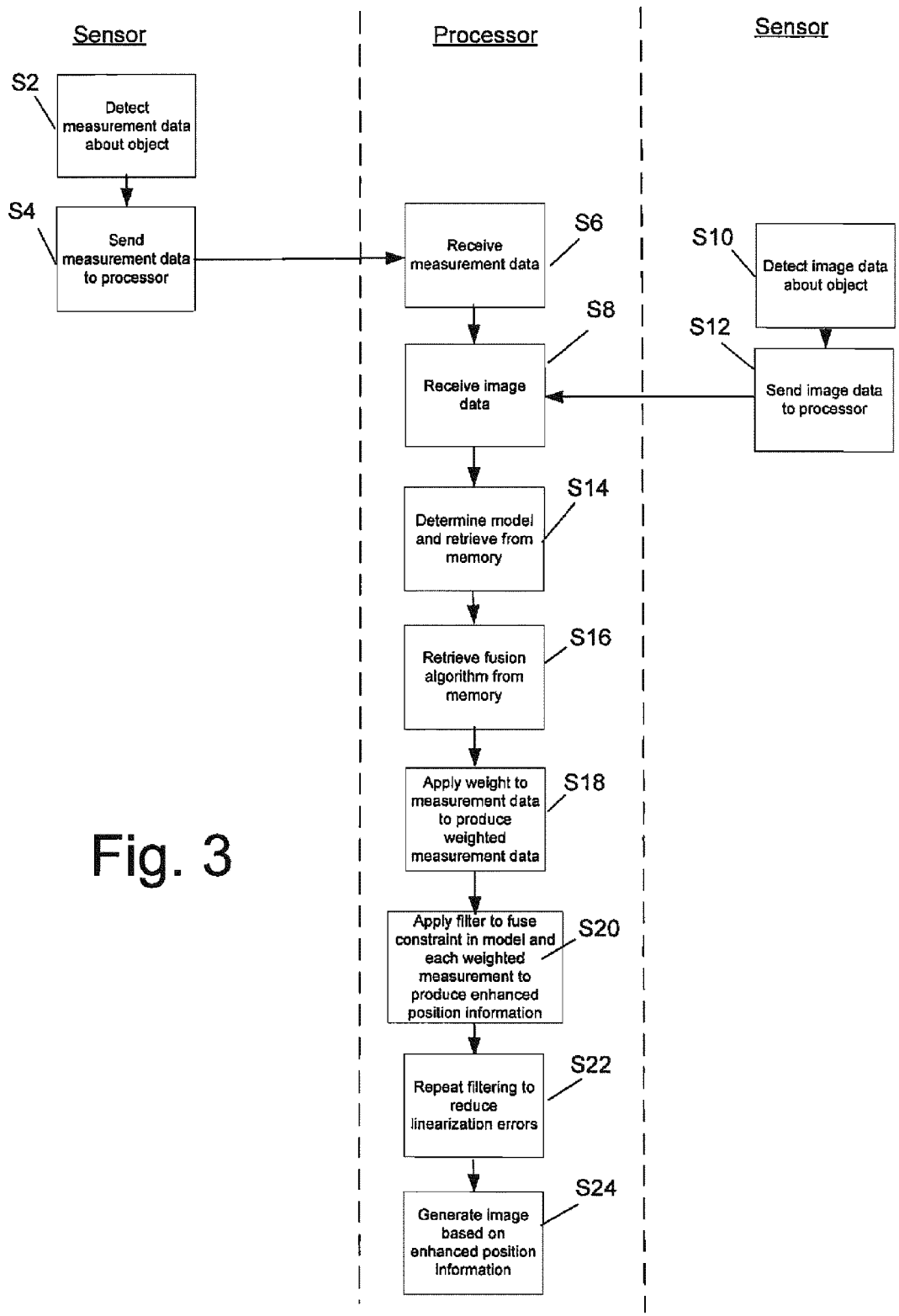
FIG. 3 depicts a flow diagram for example processes for interpretation of constrained objects in augmented reality.

FIG. 3 depicts a flow diagram for example processes for interpretation of constrained objects in augmented reality in accordance with at least some embodiments of the present disclosure. The process in FIG. 3 could be implemented using, for example, system 100 discussed above. An example process may include one or more operations, actions, or functions as illustrated by one or more of blocks S2, S4, S6, S8, S10, S12, S14, S16, S18, S20, S22, and/or S24. Although illustrated as discrete blocks, various blocks may be divided into additional blocks, combined into fewer blocks, or eliminated, depending on the desired implementation. Processing may begin for one sensor at block S2 and for another sensor at block S10.

At block S2, a first sensor may be adapted to detect measurement data about an object. Processing may continue from block S2 to block S4.

At block S4, the first sensor may be adapted to send the measurement data to a processor. Processing may continue from block S4 to block S6.

At block S6, the processor may be adapted to receive the measurement data. Processing may continue from block S6 to block S8.

At block S10, a second sensor, which may be the same or different from the first sensor, may be adapted to detect image data about the object. In some examples, the image data may be used to determine what model is appropriate for the object. In some additional examples, the image data may be used to display an image of the object. Processing may continue from block S10 to block S12.

At block S12, the sensor may be adapted to send the image data to the processor. Processing may continue from block S12 to block S8.

At block S8, the processor may be adapted to receive the image data about the object. Processing may continue from block S8 to block S14.

At block S14, the processor may be adapted to determine a model for the object and to retrieve the model from a memory. In some examples, the processor may be adapted to determine the model for the object based on the image data. Processing may continue from block S14 to block S16.

At block S16, the processor may be adapted to retrieve a fusion algorithm from the memory. Processing may continue from block S16 to block S18.

At block S18, the processor may be adapted to process the measurement data (e.g., apply a weighting factor to the measurement data) to produce weighted measurement data. In some examples, the weights may be used to account for noise or other problems in the measurement data. Processing may continue from block S18 to block S20.

At block S20, a filter may be applied to fuse each constraint in the model and each weighted measurement to produce enhanced position information. For example, the processor may be adapted to look for a corresponding measurement for each constraint and a corresponding constraint for each measurement. In the robotic arm example discussed above, the processor may be adapted to look for measurements relating to constraints for rigid component 124a (FIG. 2). Processing may continue from block S20 to block S22.

At block S22, the processor may be adapted to repeat the filtering of block S20 to reduce linearization errors. Processing may continue from block S22 to block S24.

At block S24, the processor may be adapted to generate an image of the object based on the enhanced position information, the model, and the image data.

Figure 4:
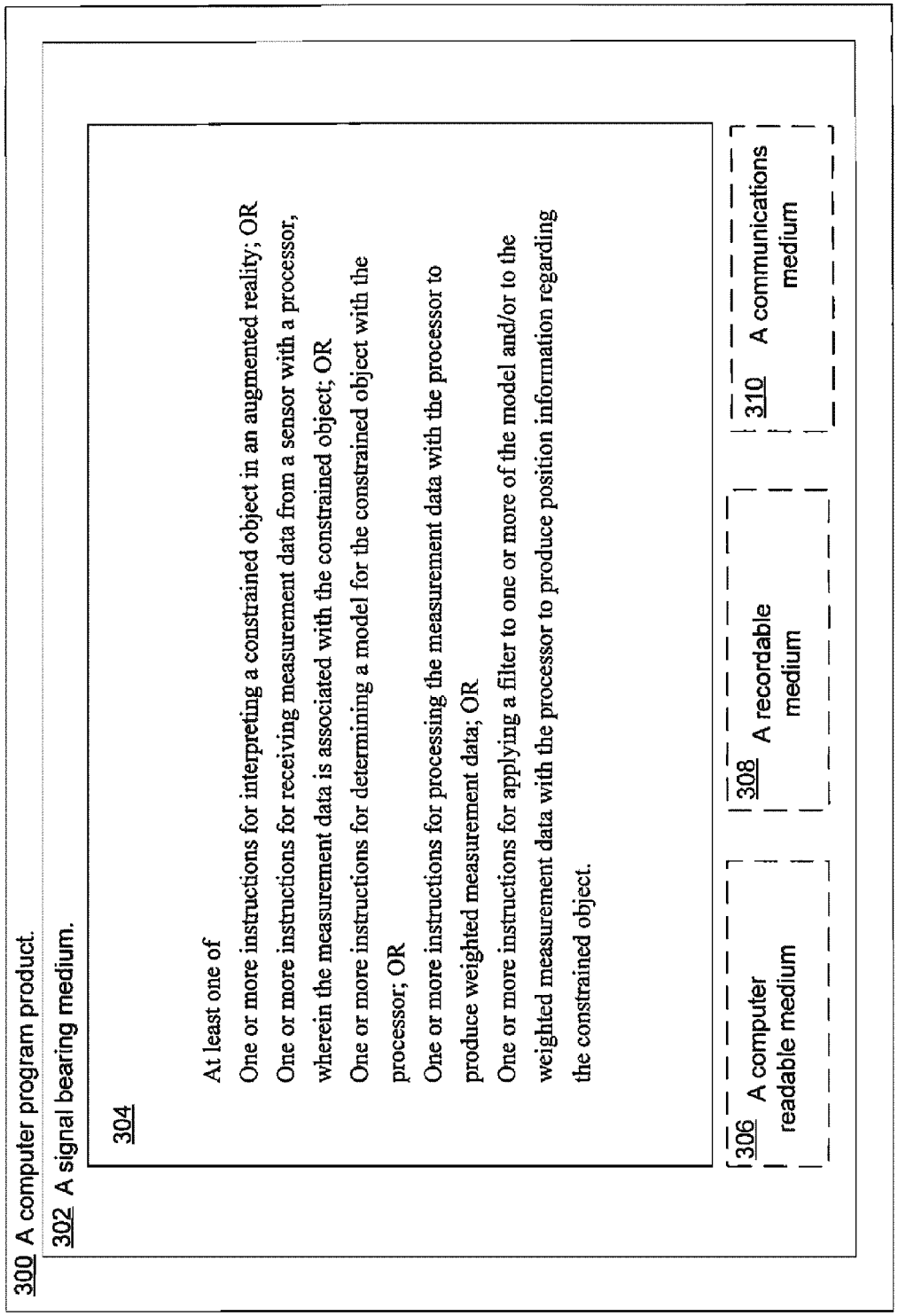
FIG. 4 illustrates computer program products for interpretation of constrained objects in augmented reality.

FIG. 4 illustrates example computer program products 300 for interpretation of constrained objects in augmented reality in accordance with at least some examples of the present disclosure. Program product 300 may include a signal bearing medium 302. Signal bearing medium 302 may include one or more instructions 304 that, when executed by, for example, a processor, may provide the functionality described above with respect to FIGS. 1-3. Thus, for example, referring to system 100, processor 116 may undertake one or more of the blocks shown in FIG. 4 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

Figure 5:
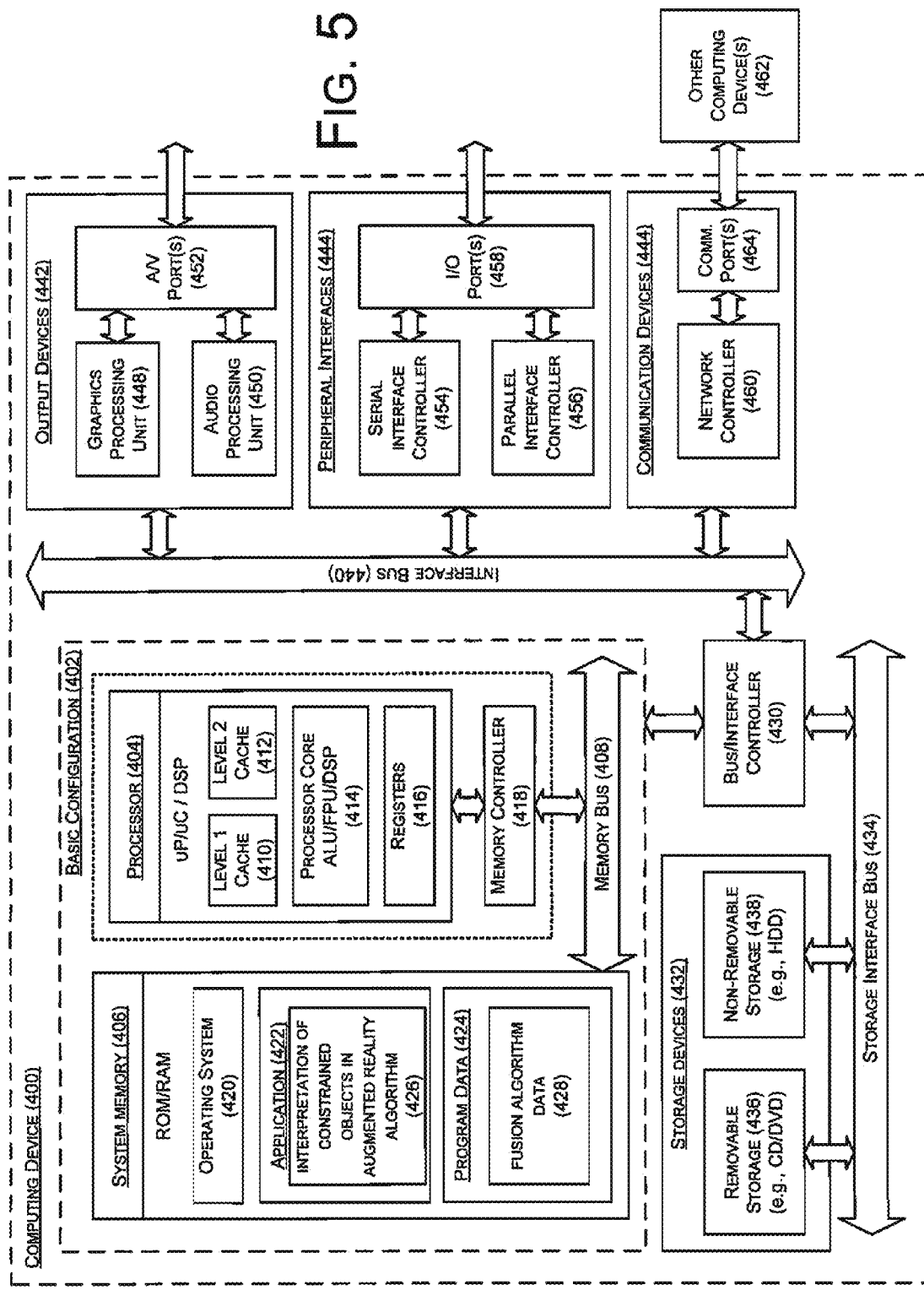
FIG. 5 is a block diagram illustrating an example computing device 400 that is arranged to perform interpretation of constrained objects in augmented reality; all arranged according to at least some embodiments presented herein.
Figure 5:
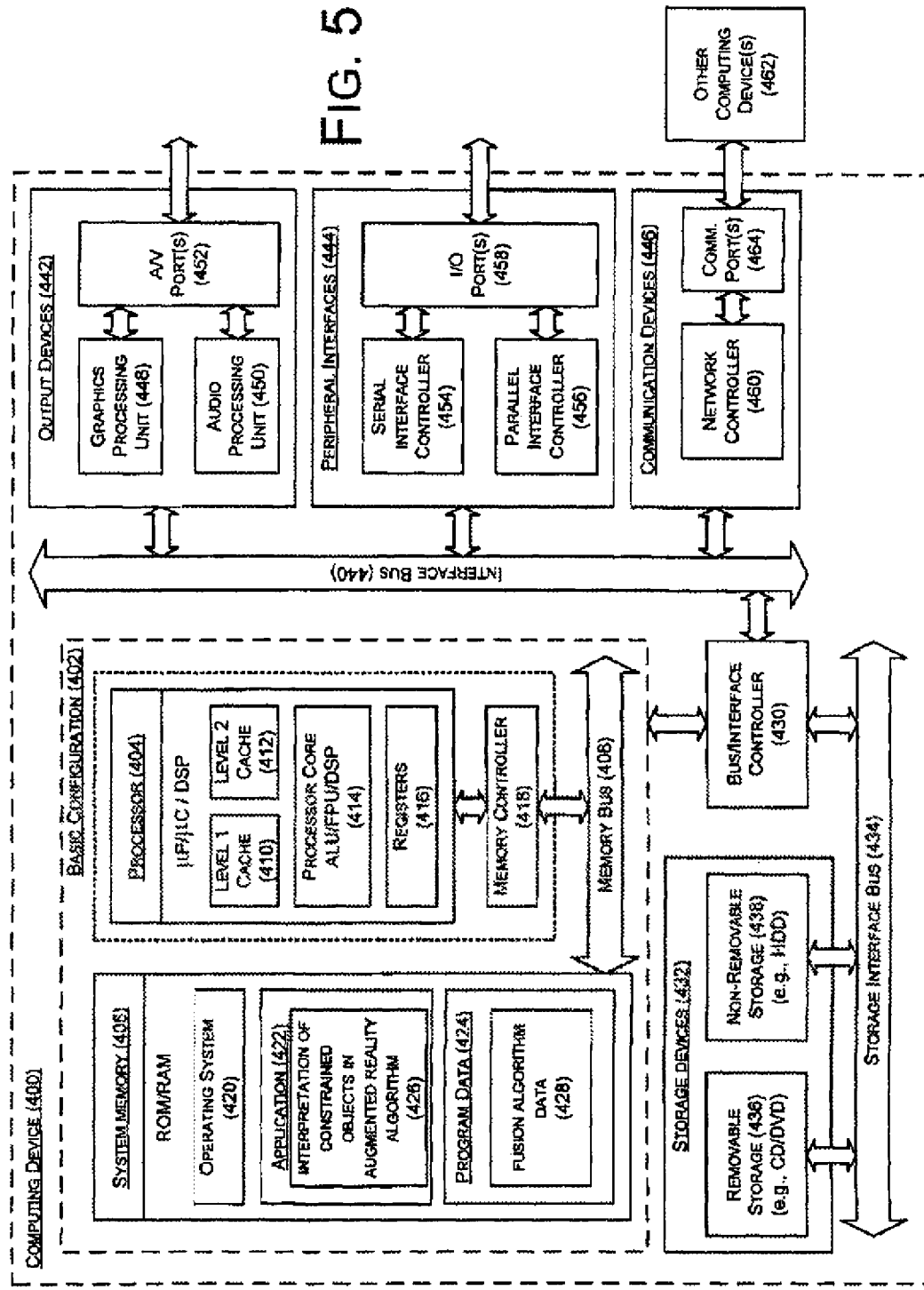

FIG. 5 is a block diagram illustrating an example computing device 400 that is arranged to perform interpretation of constrained objects in augmented reality in accordance with at least some embodiments the present disclosure. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include an interpretation of constrained objects in augmented reality algorithm 426 that is arranged to perform the functions as described herein including those described with respect to FIGS. 1-4. Program data 424 may include fusion algorithm data 428 that may be useful for interpretation of constrained objects in augmented reality algorithm as is described herein. In some embodiments, application 422 may be arranged to operate with program data 424 on operating system 420 such that interpretation of constrained objects in augmented reality algorithm may be provided. This described basic configuration 402 is illustrated in FIG. 5 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for interpreting a constrained object in an augmented reality, the method comprising:
receiving measurement data from a sensor with a processor, wherein the measurement data is associated with the constrained object;
determining a model for the constrained object with the processor;
processing the measurement data with the processor to produce weighted measurement data; and
applying a filter to one or more of the model and/or to the weighted measurement data with the processor to produce position information regarding the constrained object.

2. The method as recited in claim 1, further comprising generating an image of the constrained object, by the processor, based on the position information.

3. The method as recited in claim 1, further comprising displaying the image of the constrained object on a display.

4. The method as recited in claim 1, wherein the sensor is a first sensor and the method further comprises receiving image data from a second sensor by the processor.

5. The method as recited in claim 4, wherein determining the model includes determining the model based on the image data.

6. The method as recited in claim 5, wherein determining the model based on the image data includes applying an object recognition algorithm with the processor.

7. The method as recited in claim 4, wherein the first and second sensors are different from one another.

8. The method as recited in claim 1, wherein determining the model includes receiving an input, wherein the input is associated with a user.

9. The method as recited in claim 1, wherein applying the filter comprises:
for each particular measurement in the measurement data:
determining whether a corresponding constraint exists in the model, and
when a corresponding constraint is determined to exist in the model, adding a weighted particular measurement to the corresponding constraint; and
for each particular constraint in the model,
determining whether a corresponding measurement exists in the measurement data, and
when a corresponding measurement is determined to exist in the measurement data, adding a weighted corresponding measurement to the particular constraint.

10. The method as recited in claim 2, wherein the image is based on the model and the image data.

11. The method as recited in claim 1, wherein the filter is one or more of a Kalman filter, an extended Kalman filter, or a particle filter.

12. The method as recited in claim 1, the method further comprising propagating the position information using the model by the processor to determine additional position information about a first component of the constrained object, wherein the additional position information relates to a second component of the constrained object.

13. A device for interpreting a constrained object in augmented reality, the device comprising:
a memory; and
a processor arranged in communication with the memory, wherein the processor is configured to:
receive measurement data from a sensor regarding the constrained object;
determine a model for the constrained object;
process the measurement data to produce weighted measurement data;
apply a filter to the model and to the weighed measurement data to produce position information regarding the constrained object; and
store the position information in the memory.

14. The device as recited in claim 13, wherein the processor is further configured to generate an image of the constrained object based on the position information.

15. The device as recited in claim 14, further comprising a display arranged in communication with the processor, wherein the display is configured to display the image of the constrained object.

16. The device as recited in claim 13, wherein the sensor is a first sensor, and wherein the processor is configured to receive image data from a second sensor.

17. The device as recited in claim 16, wherein the first and second sensors are different from one another.

18. The device as recited in claim 13, wherein the processor is further configured to:
for each particular measurement in the measurement data
determine whether a corresponding constraint exists in the model, and
when a corresponding constraint is determined to exist in the model, add a weighted particular measurement to the corresponding constraint; and
for each constraint in the model,
determine whether a corresponding measurement exists in the measurement data, and
when a corresponding measurement is determined to exist in the measurement data, add a weighted corresponding measurement to the particular constraint.

19. The device as recited in claim 15, wherein the image is based on the model and the image data.

20. A system for interpreting a constrained object in augmented reality, the system comprising:
a processor;
a memory arranged in communication with the processor;
a display arranged in communication with the processor; and
a sensor arranged in communication with the processor, the sensor effective to detect measurement data regarding the constrained object, the sensor effective to send the measurement data from the sensor to the processor;
wherein the processor is configured to
receive the measurement data,
determine a model for the constrained object,
process the measurement data to produce weighted measurement data,
apply a filter to the model and to the weighted measurement data to produce position information regarding the constrained object,
store the position information in the memory, and
generate an image based on the position information; and
the display is effective to display the image.

21. The system as recited in claim 20, wherein the sensor is a first sensor and the system further comprises a second sensor arranged in communication with the processor, wherein the second sensor is configured to receive image data and send the image data from the second sensor to the processor.

22. The system as recited in claim 21, wherein the first and second sensors are different from one another.

23. The system as recited in claim 21, wherein the processor is further configured to:
for each particular measurement in the measurement data
determine whether a corresponding constraint exists in the model, and
when a corresponding constraint is determined to exist in the model, add a weighted particular measurement to the corresponding constraint;
for each particular constraint in the model,
determine whether a corresponding measurement exists in the measurement data, and
when a corresponding measurement is determined to exist in the measurement data, add a weighted corresponding measurement to the particular constraint.

24. A method for interpreting a constrained object in augmented reality, the method comprising:
detecting measurement data regarding the constrained object at a sensor;
sending the measurement data from the sensor to a processor;
receiving the measurement data by the processor;
determining a model for the constrained object by the processor;
processing the measurement data with the processor to produce weighted measurement data;
applying a filter, by the processor, to the model and to the weighted measurement data to produce position information regarding the constrained object;
generating an image based on the position information by the processor;
sending the image from the processor to a display;
receiving the image at the display; and
displaying the image on the display.

25. The method as recited in claim 24, wherein the sensor is a first sensor and the method further comprises receiving image data from a second sensor by the processor.

26. The method as recited in claim 25, wherein the first and second sensors are different from one another.

27. The method as recited in claim 24, wherein applying the filter includes:
for each particular measurement in the measurement data
determining whether a corresponding constraint exists in the model, and
when a corresponding constraint is determined to exist in the model, adding a weighted particular measurement to the corresponding constraint; and
for each particular constraint in the model,
determining whether a corresponding measurement exists in the measurement data, and
when a corresponding measurement is determined to exist in the measurement data, adding a weighted corresponding measurement to the particular constraint.

28. The method as recited in claim 24, wherein when the model includes a constraint with an inequality defining a space, the method further comprises:
adding a parameter to the constraint with the inequality to produce an equality constraint;
applying the filter to the equality constraint and to the weighted measurement data to produce additional position information regarding the constrained object; and
determining whether the additional position information falls within the space.

29. The method as recited in claim 24, wherein the image is based on the model and the image data.

30. A non-transitory computer storage medium having computer-executable instructions stored thereon which, when executed by a computing device, adapt the computing device to perform a method for interpreting a constrained object in augmented reality, the method comprising:
receiving measurement data from a sensor with a processor, wherein the measurement data is associated with the constrained object;
determining a model for the constrained object by the processor;
processing the measurement data to produce weighted measurement data by the processor; and
applying a filter, by the processor, to the model and to the weighted measurement data to produce position information regarding the constrained object.

31. The storage medium as recited in claim 30, wherein the method further comprises generating an image of the constrained object, by the processor, based on the position information, and displaying the image of the constrained object on a display.

* * * * *

UNITED STATES PATENT AND TRADEMARK OFFICE
CERTIFICATE OF CORRECTION

PATENT NO. : 8,400,471 B2
APPLICATION NO. : 12/719086
DATED : March 19, 2013
INVENTOR(S) : Leung It is certified that error appears in the above-identified patent and that said Letters Patent is hereby corrected as shown below:

In the Drawings

In Fig. 5, Sheet 5 of 5, below "PROCESSOR (404)", Line 1, delete "UP/UC/ DSP" and insert -- µP/µC/ DSP --, therefor.

In Fig. 5, Sheet 5 of 5, delete "COMMUNICATION DEVICES (444)" and insert -- COMMUNICATION DEVICES (446) --, therefor. (See Attached Sheet)

In the Specification

Column 2, Lines 66-67, delete "processor 108." and insert -- processor 116. --, therefor.

In Column 7, Line 61, delete "interpreted" and insert -- interpreted as --, therefor.

In the Claims

In Column 10, Line 48, in Claim 20, delete "to" and insert -- to: --, therefor.

Signed and Sealed this
Twentieth Day of August, 2013

Teresa Stanek Rea
*Acting Director of the United States Patent and Trademark Office*